United States Patent [19]

Timm et al.

[11] 4,435,845
[45] Mar. 6, 1984

[54] AUTOMOBILE RADIO AND TAPE CASSETTE SWITCHING APPARATUS

[75] Inventors: Horst Timm, Hildesheim; H. Eckard Kruger, Hildesheim-Sorsum, both of Fed. Rep. of Germany

[73] Assignee: Blaupunkt-Werke GmbH, Hildesheim, Fed. Rep. of Germany

[21] Appl. No.: 393,417

[22] Filed: Jun. 29, 1982

[30] Foreign Application Priority Data

Jul. 2, 1981 [DE] Fed. Rep. of Germany ....... 3126117

[51] Int. Cl.³ .............................................. H04B 1/20
[52] U.S. Cl. .................................... 455/228; 455/345; 369/6; 381/123
[58] Field of Search .................... 455/31, 38, 227, 228, 455/344, 345, 132, 140, 142; 369/6; 381/123; 340/33

[56] References Cited

U.S. PATENT DOCUMENTS

| | | | |
|---|---|---|---|
| 3,949,401 | 4/1976 | Hegeler | 455/227 |
| 4,060,766 | 11/1977 | Kazuo | 369/6 |
| 4,334,320 | 6/1982 | Liman | 455/227 |

FOREIGN PATENT DOCUMENTS

| | | | |
|---|---|---|---|
| 2536076 | 3/1977 | Fed. Rep. of Germany | 358/189 |
| 54-139507 | 10/1979 | Japan | 369/6 |

OTHER PUBLICATIONS

Literature, "Essen Stereo CR Super–Arimat", 7 630 925 010.

*Primary Examiner*—Jin F. Ng
*Attorney, Agent, or Firm*—Frishauf, Holtz, Goodman & Woodward

[57] ABSTRACT

Automobile radio - cassette combination which includes a special announcement decoder, for example to decode traffic announcements and the like. To shield passengers in an automotive vehicle from additionally listening to announcements, while permitting passengers to continue to listen to recorded programs on a tape, for example, while permitting the operator to listen to traffic announcements, the switching network of the radio with the announcement feature is expanded, and coupled with a selector switch permitting, selectively, operation of:

(a) earphone reproducing cassette; loudspeaker muted, automatic announcement reproduction maintained;
(b) earphones reproduce radio program, loudspeaker muted, automatic announcement reproduction via loudspeaker maintained;
(c) earphone reproduces cassette, loudspeaker reproduces radio program, including announcements;
(d) loudspeaker reproduces cassette program, radio muted.

Upon recognition of an announcement signal, the cassette is muted and may be stopped, and the announcement is reproduced in the loudspeaker. Alternatively, the fact that an announcement is being broadcast can be separately indicated, without interruption of the cassette reproduction.

8 Claims, 6 Drawing Figures

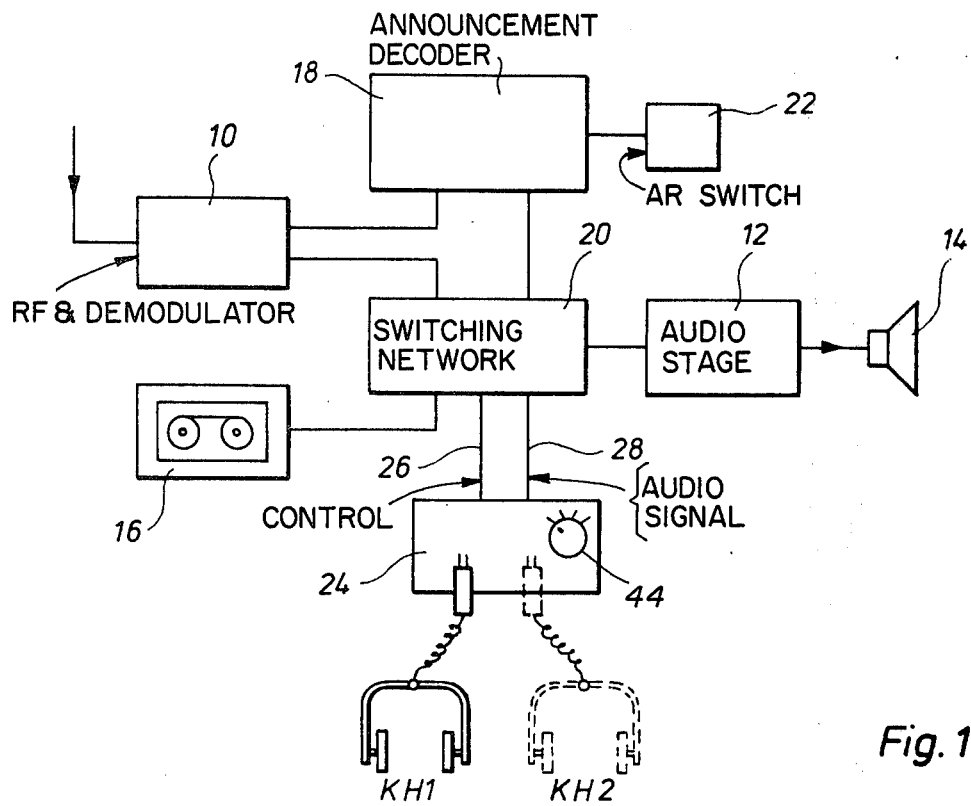
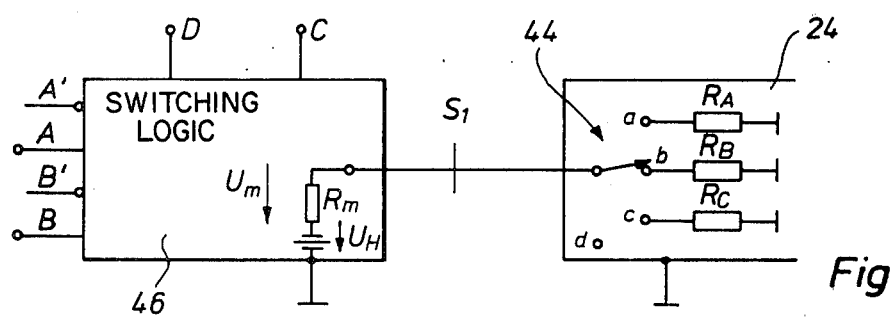
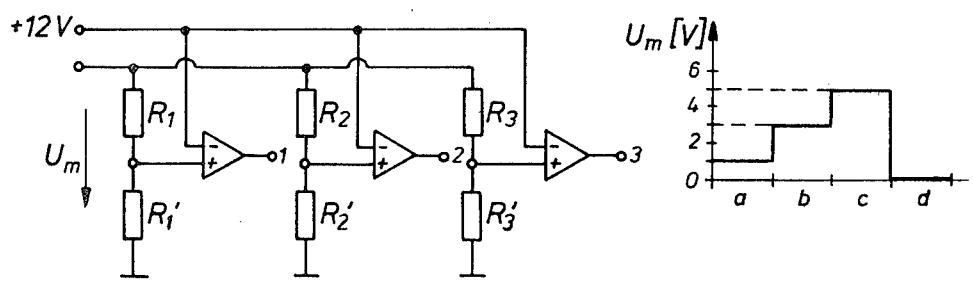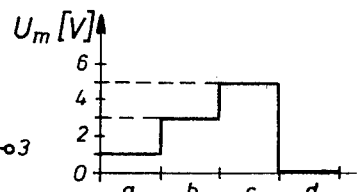
Fig. 1
Fig. 4
Fig. 5
Fig. 6

AUTOMOBILE RADIO AND TAPE CASSETTE SWITCHING APPARATUS

Reference to related patent, the disclosure of which is hereby incorporated by reference, and to applications, assigned to the assignee of the present invention:
U.S. Pat. No. 3,949,401, HEGELER et al., Apr. 6, 1976.
U.S. Ser. No. 06/319,653, filed Nov. 9, 1981, EILERS and BRAGAS;
U.S. Ser. No. 06/319,654, filed Nov. 9, 1981, EILERS and BRAGAS;
U.S. Ser. No. 06/319,655, filed Nov. 9, 1981, EILERS and BRAGAS.

The present invention relates to a combined automobile ratio-tape cassette combination, and more particularly to a radio which includes a decoder to decode if a radio station broadcasts special announcements. Such announcements may, for example, be traffic announcements or sports announcements, or the like, and may include police information, such as blocking of roads, icing, accidents on specific roads causing traffic tie-ups, and other information of interest and important to a listener in a vehicle.

BACKGROUND

The referenced U.S. Pat. No. 3,949,401, HEGELER et al., describes an FM transmission system in which special recognition frequencies are used for special announcements which are not to be missed by the user of automobile radio receivers. Transmitters which radiate such special announcements can be recognized by radio receiver equipment by sensing an auxiliary carrier which is radiated in addition to the program modulation. A suitable frequency for the additional carrier, besides the program modulation, is 57 kHz which, in stereo transmitters, is radiated as the third harmonic of the 19 kHz stereo pilot tone, in synchronism therewith. The 57 kHz auxiliary carrier is phase-locked to the pilot tone of the 19 kHz carrier so that the zero or null crossings are synchronous, and in the same crossing direction. The auxiliary carrier is used additionally for the transmission of auxiliary information, hereinafter referred to as recognition, which are superimposed in the form of amplitude modulation on the auxiliary carrier. For a detailed discussion, the referenced U.S. Pat. No. 3,949,401, and the literature cited therein, is referred to.

One of the "recognitions is radiated together with the announcement. The respective recognition indicates that, during radiation over the FM transmitter, an announcement is being broadcast and, therefore, will be termed herein "announcement recognition", AR for short. An announcement recognition signal—an AR signal—corresponds to the signals described as the DK signals in the aforementioned U.S. Pat. No. 3,949,401. The AR signal is within a very narrow frequency band of 125 Hz, modulating the auxiliary carrier of 57 kHz with a predetermined percent of the amplitude of the auxiliary carrier.

The receiver which is arranged to operate with the system includes a 57 kHz detector and an amplitude demodulator and switching in the audio stage. The 57 kHz detector and the amplitude demodulator control the switching of the audio output. Various switching arrangements are possible, for example the amplitude of reproduction during the announcement could be raised to call specific attention thereto—for example to a traffic warning announcement; or, if the receiver is muted, a muting circuit is disabled; or, in a combined radio-cassette recorder, the audio section can be switched over from reproduction from the cassette to reproduction of the announcement when the announcement starts, and for switch-back to reproduction from the tape cassette when the announcement has terminated. Tape transport in the cassette can also be controlled to cause the cassette to stop and start in synchronism with interruption of its audio output.

The auxiliary 57 kHz carrier can provide further recognition signals; one further such recognition signal can be used to characterize the specific transmitting radio station, or a geographic region. All transmitters capable of radiating the announcements which are within a specific geographical region, for example, may be assigned the same region recognition, for short RR, and provide RR-signals, which correspond to the BK signals of the aforementioned U.S. Pat. No. 3,949,401. The traffic announcement within a region generally relate to the same geographical area. The region recognition signal modulates the amplitude of the auxiliary carrier continuously with a predetermined percent of the auxiliary carrier amplitude, for example 60%. The band width of the various region recognition signals, and their position with respect to each other is is so selected that, with the quality factor of more than 20, adjacent channel separation of more than 15 db is obtained. Within the available frequency band, 6 RR signal frequencies have been set in one system, and so relatively positioned that the harmonics of any RR signal fall outside of any other RR signal. Suitable frequencies for region recognition, that is, RR signals, are for example 23.75 Hz, 28.27 Hz, 34.93 Hz, 39.58 Hz, 46.67 Hz, 53.98 Hz, 63.61 Hz, 75.80, 98.96 Hz, and 122.85 Hz.

During an announcement, the auxiliary 57 kHz subcarrier is modulated by two recognition signals, namely the AR announcement recognition signal and the RR region or radio station recognition signal. When no announcement is being given, the auxiliary 57 kHz carrier is modulated only with the RR, the region recognition signal.

For further details of the system, reference is made to the aforementioned U.S. patent HEGELER et al. and to the applications Ser. Nos. 06/319,653, 06/319,654, 06/319,655, EILERS and BRAGAS, all filed Nov. 9, 1981.

The region recognition signal may also be used as a radio station recognition signal, based upon availability of frequencies so that, within any one geographical area, different transmitters may have different radio station recognition or RR frequencies assigned thereto.

The radio set may be constructed in various ways, for example to reproduce continuously radiated FM signals, or so arranged that the radio which is turned ON does not reproduce any audio signal, however, but only evaluates the AR or announcement recognition signal, radiated during an announcement, if the tuning section is tuned to a station which also radiates the RR or radio station recognition signal. This tuning may be manual or automatic. When no AR signal is being radiated, the radio audio reproduction may be low, or completely muted, or the audio section can be changed over to a differently tuned radio station, or to reproduce an audio program on a cassette. Cassette operation is interrupted during the presence of the AR signal, that is, during an announcement.

In a simpler set, the AR signal is evaluated only to provide an output indication, visible, or audible, or both, so that the operator of a vehicle is alerted to listen to the announcement. In dependence on the type of radio selected, tuning may be manual or automatic, for example by a "signal search" tuning section.

Radios of this type provide the opportunity to a vehicle operator to be continuously advised of traffic conditions.

Audio reproduction from the radios as known is over loudspeakers. If the vehicle carries passengers, it may be desirable for a passenger to continue to listen to a cassette program, or to a program being radiated by a station which does not carry the special announcements, while the operator of the vehicle may be interested in listening to the special announcement, which may relate to traffic conditions—although it could also contain other announcements, such as sport reports, for example.

Existing equipment does not permit individual selection of the programs by a passenger and a vehicle operator; rather, the passenger must listen to what the vehicle operator determines.

THE INVENTION

It is an object to provide an automobile radio-cassette combination which includes a circuit section which may, for example, be an accessory which is so arranged that a passenger need not listen to announcements being radiated by a transmitter which provides an announcement recognition (AR) signal, but which continues to provide the operator with all previously available functions, namely traffic information, indication of presence of an announcement recognition signal, warning functions, and the like, so that the individual listening needs or desires of an operator and one or more passengers in a motor vehicle can be accommodated.

Briefly, a circuit is provided, which may be in form of an accessory stage, which has at least one earphone plug; and a switch is provided, establishing a switching path which forms part of the multiple switching network of the radio set, and which is controlled, selectively, by selectively enabled switching signals to provide for reproduction of radio signals or tape signals derived from the radio output stage by the earphones independently of reproduction of special announcement signals by the audio reproducer of the radio.

The system has the advantage that passengers in automotive vehicles can listen to programs in accordance with their own selections, without being concerned with special announcements, for example traffic or warning announcements, in which only the operator of the vehicle is interested; the system also permits the passenger to listen to such announcements, for example to specially alert the operator to certain situations or announcements which a driver may miss due to concentration on existing traffic conditions. The system, thus, permits selective use and reproduction of entertainment or other programs, for example, without in any way interfering with the important safety functions which may be contained in special announcements.

In accordance with a preferred embodiment of the invention, the system permits not only cassette operation with reproduction over a loudspeaker, and the radio muted, connected only to receive traffic announcements, but further three different operating modes:

(1) reception of a radio program by earphone, with radio muted;
(2) reception of taped program over earphone, with radio muted;
(3) reception of a radio program with reproduction by loudspeaker and, simultaneously, reception of taped program over the earphone.

In all three modes of operation, announcements are reproduced, or an indication is being given that an announcement is about to occur, so that the safety and warning functions of the announcement system is fully maintained.

Switch-over preferably is effected with a selector switch which, in a preferred form, is a passive element controlling a switching logic to generate switching signals which route the various programs over the selected paths. An electronic switch which is already present and used for controlling announcement signals can be expanded in its function to additionally permit the expanded operating modes of reproduction.

Various other switching functions can be obtained by a simple and inexpensive further expansion of switching functions, if such is desired. For example, and without requiring any substantial additional material, more than one earphone may be used in connection with the apparatus; if more than one earphone is used, one of them, for example, may be set to receive radio programs, and another to receive cassette programs, again, selectively, with the loudspeaker being muted or, selectively, reproducing radio or cassette output. If cassette output is selected, the cassette drive will continue to provide a continuous cassette program for the passengers so that, if an announcement is provided, the loudspeaker will skip a portion of the taped program on the cassette.

DRAWINGS

FIG. 1 is a schematic diagram of a radio with traffic decoding capability, and the circuitry in accordance with the present invention;

FIG. 4 is a schematic diagram showing the switching logic to obtain analog control signals for switching of an electronic switch in dependence on three selected positions of a selector switch;

FIG. 5 is an analog-digital converter to be used with the circuit of FIG. 4; and FIG. 6 is a diagram of the analog signals derived from the circuit of FIG. 4 in dependence on selected switch positions.

Figure 2:
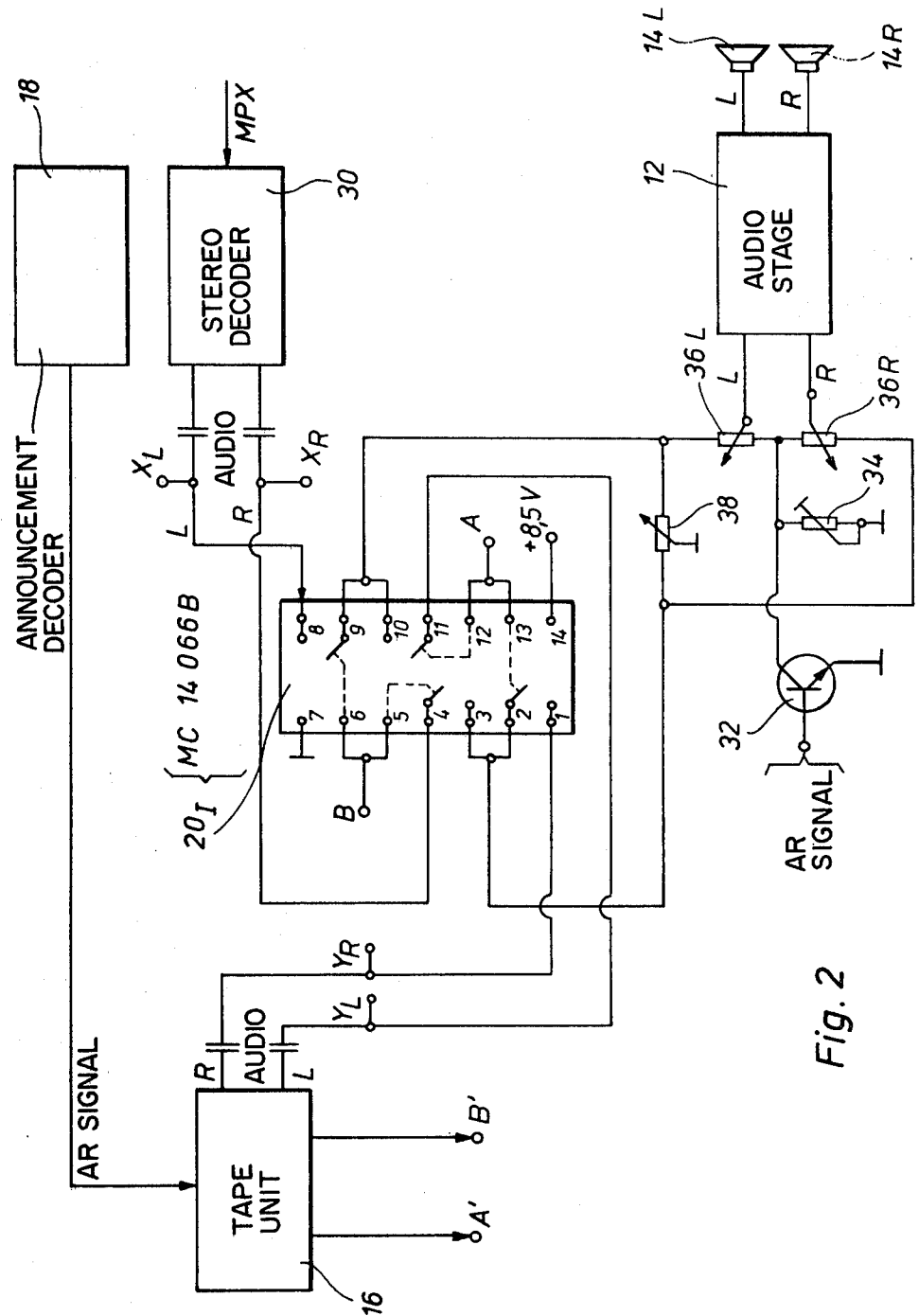
FIG. 2 is a part-schematic, part-block diagram of a radio in accordance with the prior art.

A combined automobile radio-cassette unit for FM stereo radio reception and stereo cassette reproduction is schematically shown in FIG. 1; it includes a radio frequency (RF) stage 10, an audio stage 12, including the required amplifiers, a loudspeaker 14, and a magnetic tape cassette or cartridge transducer unit 16. The RF stage 10 is connected to an announcement decoder stage 18 which includes an evaluation stage to decode an announcement recognition (AR) signal. If an announcement signal is decoded in decoder 18, a control signal is applied to an electronic audio switching network 20. An announcement recognition output indicator switch 22 is connected to decoder 18 to control, through the decoder 18, the switching network to either provide an audio reproduction of the respective announcement, or an indication that an announcement is being broadcast, and that, therefore, the user should properly operate the radio to listen to the announcement. If the AR switch is closed, then, in the usual operation, the electronic switching network 22 will transfer signals from the RF section 10, and including the announcement to the audio stage 12 for reproduction in loudspeaker 14 only when an announcement is actually being broadcast.

The connections of the various switching elements are shown only schematically, since such circuits and their functions are known in general principle. Generally, the electronic switch 20 carries out all the switching of the respective circuit paths which are necessary in order to reproduce an announcement being broadcast and received by an antenna connected to the RF stage 10, so that the vehicle operator can listen to the announcement on loudspeaker 14. All switching of the tape stage 16, the RF stage 10, and the like, is done in the switching network 20. Change-over of the electronic switches in network 20 then is effected in dependence on control signals which are generated in response to decoded announcements or AR signals, the respective RR signals, and the listening mode desired by the user.

In accordance with the present invention, the network of FIG. 1, described so far, is expanded by including an additional switching portion 24 with connection to two earphones KH1, KH2; one earphone will always be provided; additional earphone connections may be provided and, since not strictly necessary but possibly used, the earphone KH2 and the respective connection are shown in broken lines. The respective earphones KH1, KH2 are enabled, as will be described below. A control line 26 leading from the switching network 20 controls operation of the network 24; the audio signals are transferred over the audio signal line 28.

Element 24 may be part of the overall radio-cassette unit, or may be placed in a separate accessory box; it can also form an additional attachment element coupled to the section including the switching network 20, or placed close to the output lines in which, at the same time, a balance control as well as a volume control for the earphones KH1, KH2 are placed; ON/OFF switches for the earphones may also be contained therein. Preferably, if an accessory or attachment box is used, it should contain only passive elements so that no separate power supply is required therefor. The components within the box can be placed physically remote from the radio set, for example positioned for easy access to a passenger on the front seat of a motor vehicle, for example between the front seats of a motor vehicle, so that operation and selection of programs can be carried out by the passenger without requiring attention by the divider, or interfering with the driver's attention to traffic conditions.

Wireless earphones are particularly suitable in applications in automotive vehicles, especially earphones which, in accordance with well known arrangements, are controlled by infrared (IR) signals. Such earphones and controls thereof are known, both for small-area reception, as well as for use in auditoriums and the like. IR transducers are placed in small units integrated in the clip of an earphone, within which are included the battery necessary for remote reception, a transmitter and a receiver diode, and necessary controls for right-left balance and volume control. With such arrangements, wireless connection between the earphones and the radio set installed, for example, within the motor vehicle, is possible. FIG. 1 shows the customary link between the earphones KH1, KH2 and unit 24 by wire-and-plug connection.

The invention will be described in connection with a commercial stereo automobile radio, known under the tradename "Essen Stereo CR Super-Arimat", sold by, and available from the assignee of the present application. The basic circuit thereof is illustrated in FIG. 2; adaptation to other types of radios is readily possible in accordance with known circuit design.

FIG. 2 is only a fragmentary diagram, and should be read together with FIG. 1. The announcement decoder 18 provides the AR signal to the tape unit 16, in this case directly, in order to control the tape unit to inhibit output when an announcement signal is being radiated. The stereo decoder 30, which receive a stereo input signal MPX, forms part of the FM receiver, and provides respective left (L) and right (R) output signals at audio level. The stereo decoder 30 is coupled through capacitors to the respective lines LR which have junction or connection points $X_L$, $X_R$, for further connection to the expanded circuit in accordance with the present invention. The tape unit 16 likewise provides right (R) and left (L) audio output signals which are tapped off at junctions $Y_L$, $Y_R$. The electronic switch $20_I$ which, for example, can be an integrated switching circuit of the type MC14 066B, has control inputs A, B and a supply input of +8.5 V, as well as a ground or chassis connection, terminal 7. The MPX signal is derived from the ratio detector of the RF section 1 of the radio set and is the multiplex signal supplied to the stereo decoder 30.

The switching network $20_I$ includes four switches which are, respectively, controlled by signal inputs applied to the various control terminals.

The control signals A', B' for the switching network $20_I$ are applied to the respective terminals A and B of the switching network $20_I$. The are generated in dependence on the generation of the AR signal, as decoded in the announcement decoder 18, and applied to the tape unit 16. The circuit, in accordance with FIG. 2, thus operates under the conditions that the signal A' is applied to terminal A, the signal B' is applied to terminal B, that is, A'=A, B'=B. The operating mode, thus, is in accordance with truth table 1.

If the circuit is in cassette operation, and the radio receiver muted but tuned to a transmitter which provides announcements, and turned ON, so that announcements can be reproduced, the cassette operation is interrupted during the time that an announcement recognition (AR) signal is applied to the cassette portion. The radio section is switched by the switching network $20_I$ to reception and reproduction by the loudspeaker. The AR signal which is applied to transistor 32 (FIG. 2) inhibits muting of the audio signal from the radio RF section 10 and, on the contrary, raises the volume level to a predetermined set level, so that announcements will be clearly understood, even though previously commanded tape reproduction has been set for soft music, for example. Resistor 34, in the muting section of the receiver, sets the reproduction level in the audio stage 12 when an AR signal is received. Balance and volume control under other operating conditions are set by potentiometers 36R, 36L, 38.

Figure 3:
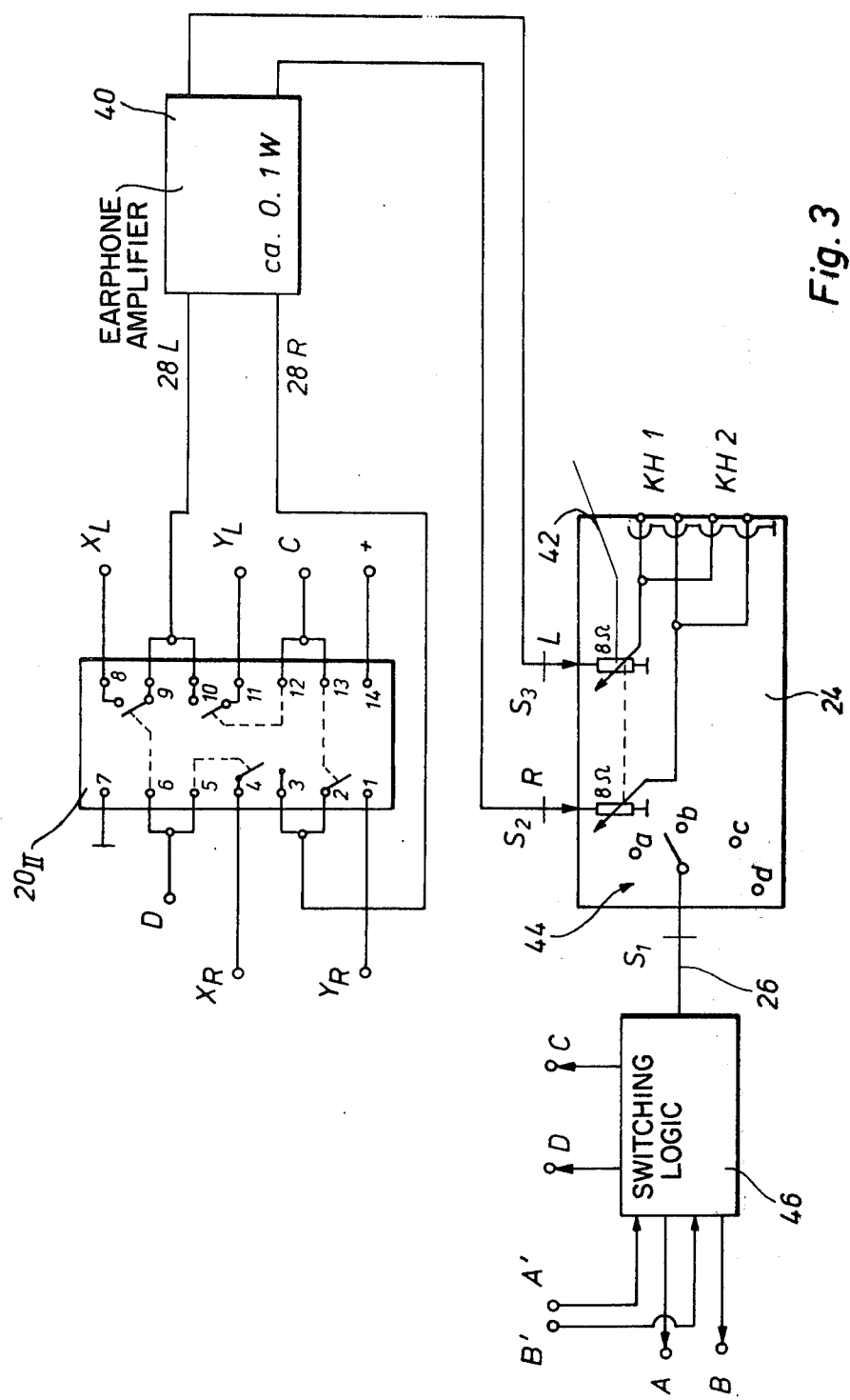
FIG. 3 is a fragmentary diagram illustrating the changes necessary to the radio of FIG. 2 in accordance with the invention.

The system of FIG. 2, which is prior art except for the tap points $X_L$, $X_R$, $Y_L$, $Y_R$, is expanded, in accordance with the present invention, as shown in FIG. 3, which only illustrates those portions necessary for an understanding of the present invention.

In accordance with a feature of the invention, the electronic switching network $20_I$ is expanded by an additional switching network $20_{II}$ which may be similar to or correspond to the switching network $20_I$, that is, include a four-position audio switch 20; the audio signal lines connected, for example, to two parallel earphone outputs KH1, KH2 are controlled to reproduce the respective audio signals derived from the radio RF stage or section 10 and/or the cassette stage 16, respectively, to establish the appropriate signal paths for the commanded reproduction mode.

Box 24 is shown in form of a connecting box or panel which retains volume controls for earphone outputs for earphones KH1, KH2, and connected to an earphone amplifier 40 of, for example, 0.1 W power output. Additionally, a selector switch 44 is provided which, for example, has four positions, a, b, c, for three reproducing modes and an OFF position d to disconnect the earphone plug connections for earphones KH1, KH2.

The selector switch 44 is connected over control line 26 (FIG. 1) to a switching logic network 26. Switching logic network 46 has further inputs A', B' (see FIG. 2), derived from the audio tape cassette stage 16.

The logic stage 46, the logic connection of which is controlled by the position of the switch 44, generates switching signals A, B, C, D which are provided for establishing circuit paths in accordance with the desired operating mode, and which are connected to the respective control inputs A, B, C, D connected to the switching elements $20_I$ and $20_{II}$ of FIGS. 2 and 3.

Switch-over of the earphones to cassette or automobile radio reproduction is carried out by the switching signals C, D in accordance with truth table 2.

In all truth tables, H signifies a voltage level of +8.5 V ("high"); O signifies a voltage level of 0 volts ("low").

The selector switch 44 can be used to change the operating modes to permit the following variations:

(a) cassette to earphones, loudspeaker muted, announcements reproduced via loudspeaker, automatically, upon generation of AR signal;

(b) radio reproduced in earphones, loudspeaker muted, announcements reproduced by loudspeaker, automatically, in accordance with AR signal;

(c) loudspeaker 14 continuously reproduces radio program, earphones continuously switched to cassette;

(d) cassette switched to loudspeaker, radio muted; this is the normal form of operation in prior art automobile radios.

To generate the switching signals for the respective operating conditions, switching logic 46 provides switching signals in accordance with truth table 3.

Remote control operation by means of a selector switch 44 included in the accessory box 24 requires only two signal lines for the audio stage—one for each side of a stereo signal—a control line 26, and a ground connection (not shown). The signal connection can be over low resistance lines and, due to the high level of the audio signal, its construction is not critical and can be in accordance with any ordinary audio wire connection.

Signals can be transmitted over an infrared (IR) link using two analog channels for a remote operating component, and a digital channel for the automobile radio cassette element. The connecting lines for such links are indicated by lines $S_1$, $S_2$, $S_3$ in FIG. 3.

Three-way connection of the earphone connectors without active elements is illustrated in FIG. 4. This is a simple connection which permits selective positioning of the connections a, b, c, d of the selector switch 44, requiring only a single signal line and a ground line to the switching logic, but no power supply.

To connect any one of the desired operating modes a, b, c, a passive resistor $R_A$, $R_B$, $R_C$ is connected by means of selector switch 44 with a measuring resistor $R_m$ which is included in the switching logic 46. The respective resistors $R_A$, $R_B$, $R_C$ are serially connected to the measuring resistor, so that the voltage which is dropped across the measuring resistor $U_m$ will change and will be representative of a respective switching voltage. This is schematically indicated in graph form in FIG. 6, in which the various switching states are shown on the abscissa, and the voltage $U_m$ across the measuring resistor on the ordinate. The switching logic 46, FIG. 4, schematically illustrates a voltage source $U_H$, which is the "high" voltage of 8.5 V, for example. Any other voltage, for example as supplied by the vehicle battery, can be used. Preferably, vehicle battery voltage dropped and stabilized, for example by a Zener diode, is employed for the voltage source so that the levels of the digital signals will not change with change in automobile battery voltage.

FIG. 5 is a circuit diagram of the principle of an analog/digital (A/D) converter to provide voltage analog output signals $U_{ma}$, $U_{mb}$, $U_{mc}$, respectively, to provide logic output signals. The circuit includes three threshold switches which, each, use voltage dividers $R_1$, $R_1'$; $R_2$, $R_2'$; $R_3$, $R_3'$, and so arranged that the outputs 1, 2, 3 have the respective desired logic output signals. Truth table 4 gives the relationships.

The logic relationship between signals 1, 2, 3 and A, B, A', B', C, D can readily be constructed by standard integrated circuit elements, connected in accordance with the foregoing truth tables, as well known in circuit design.

Let it be assumed that the selector switch 44 is connected to operating condition a; the switching logic 46 will then provide the following output signals, in accordance with truth table 1:

A=H,
B=O,
C=H,
D=O.

The audio switching networks $20_I$ and $20_{II}$ are thus so connected that the earphones will reproduce the program from the cassette, the loudspeaker 14 is muted, but will be enabled if an AR signal is sensed.

Since A'=A, and B'=B—see truth table 3— the audio switch $20_I$ will switch over the volume level of the loudspeaker for the duration of an announcement, that is, during the persistence of the AR signal, derived from the RF stage 10 of the radio. Similarly, whenever the AR signal is sensed, the loudness level of reproduction from the loudspeaker will be increased or raised to the level set by resistor 34 (FIG. 2).

The switching network $20_{II}$ (FIG. 3) is connected not only to the signals A, B, C, D of the logic switching network 46, but additionally is connected to terminals $X_L$, $Y_L$, $X_R$, $Y_R$, forming the respective connection tap points of FIG. 2.

Various changes and modifications may be made within the scope of the inventive concept.

TRUTH TABLES

Truth Table 1

| Loudspeaker 14:<br>Switching signal | Operating Mode<br>Cassette | Radio |
|---|---|---|
| A' = A | H | O |
| B' = B | O | H |

(O = OV; H = +8.5 V)

Truth Table 2

| Earphone KH1, 2<br>Switching signal | Operating Mode<br>Cassette | Radio |
|---|---|---|
| C | H | O |
| D | O | H |

(O = OV; H = 8.5 V)

Truth Table 3

| Operating Condition | A' | B' | A | B | C | D | Comparison A'B' − A B |
|---|---|---|---|---|---|---|---|
| a | H | O | H | O | H | O | = |
| b | O | H | O | H | O | H | = |
| c | H | O | O | H | H | O | ≠ |
| d | H | O | H | O | not applicable | | = |

(O = OV and H = 8.5 V)

Truth Table 4

| Operating Condition | $U_m$ | Output 1 | Output 2 | Output 3 |
|---|---|---|---|---|
| (a) | $0V < U_m < 2V$ | H | H | H |
| (b) | $2V < U_m < 4V$ | O | H | H |
| (c) | $4V < U_m < 6V$ | O | O | H |
| (d) | $0V$ | H | H | H |

We claim:

1. Automobile radio-tape reproducing equipment combination having
    a radio frequency and demodulation stage (10) providing radio audio signals;
    a magnetic tape system (16) providing tape audio signals;
    an announcement information decoder (18) coupled to said radio frequency and demodulation stage for decoding special announcement code signals and providing an announcement recognition (AR) signal;
    an audio stage (12);
    a loudspeaker (14) coupled to said audio stage;
    and a multiple switching network (20) coupled to said radio frequency and demodulation stage and said magnetic tape system and connected to and controlled by the announcement information decoder and coupled to the audio stage for providing output signals controlling audio reproduction of special announcement upon decoding of the announcement recognition code, and comprising, in accordance with the invention,
    an accessory stage (24) having at least one earphone connecting plug (KH1, KH2);
    and a switching network ($20_{II}$) forming part of the multiple switching network, and a selector switch (44), the switching network being controlled by selectively enabled switching signals from the selector switch and the special announcement information decoder (18) to control, selectively, circuit paths for application of radio audio signals, or tape audio signals, to at least one earphone plug, independently of reproduction of special announcement recognition (AR) signal.

2. Combination according to claim 1, wherein said accessory stage includes a logic switching stage (46) receiving control signals (A', B') generated by the special information decoder (18);
    the selector switch (44) being connected to the switching logic network, said switching logic network generating the respective switching signals for the switching network ($20_{II}$).

3. Combination according to claim 1, wherein the earphone plug is connected through the accessory stage solely by passive network components.

4. Combination according to claim 3, wherein the selector switch (44) includes a group of resistors ($R_A$, $R_B$, $R_C$) connected to respective switching positions (a, b, c) of the selector switch;
    a measuring resistor ($R_m$) located separately from said accessory stage, and a source of voltage connected to said measuring resistor, said measuring resistor being, selectively, connectable through said selector switch with a selected one of said resistors, the voltage across said measuring resistor changing in dependence on the particular resistor selector by the selector switch, said voltage forming a control signal of varying level.

5. Combination according to claim 1 further including an earphone amplifier (40) serially connected to the earphone plug.

6. Combination according to claim 1, wherein said accessory stage includes an ON/OFF switching position (d) and balance and volume control elements (42) for said earphone.

7. Combination according to claim 1, in combination with an earphone; and a wireless link between said earphone plug and said earphone.

8. Combination according to claim 7, wherein said wireless link comprises an infrared (IR) transmission link.

* * * * *